July 30, 1957 L. A. PELLON 2,800,976
DUST COLLECTOR
Filed March 8, 1954 3 Sheets-Sheet 1
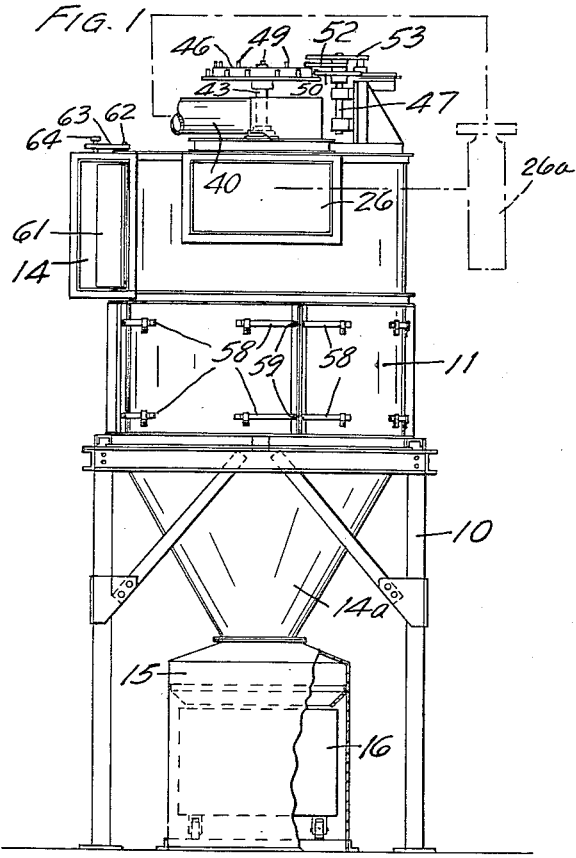
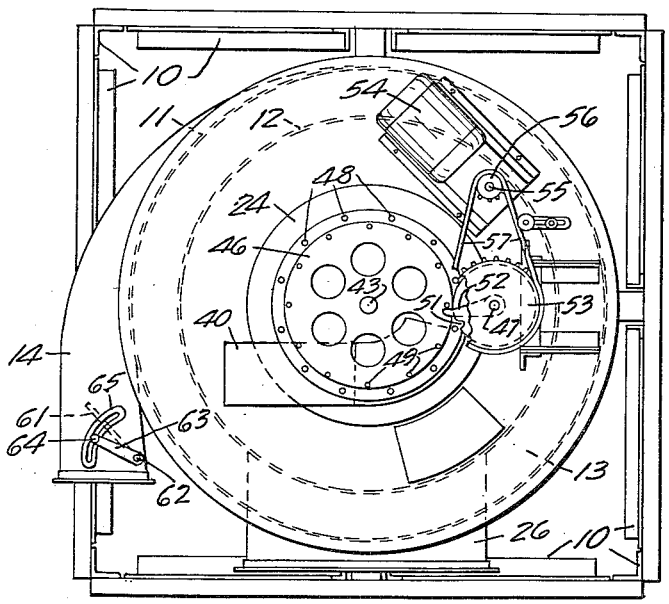
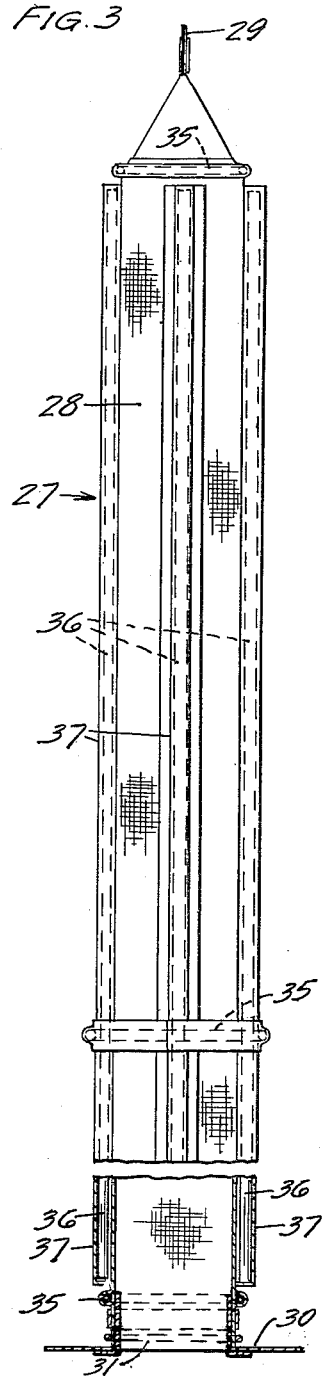
INVENTOR
LOUIS A. PELLON
BY John E. Stryker
ATTORNEY

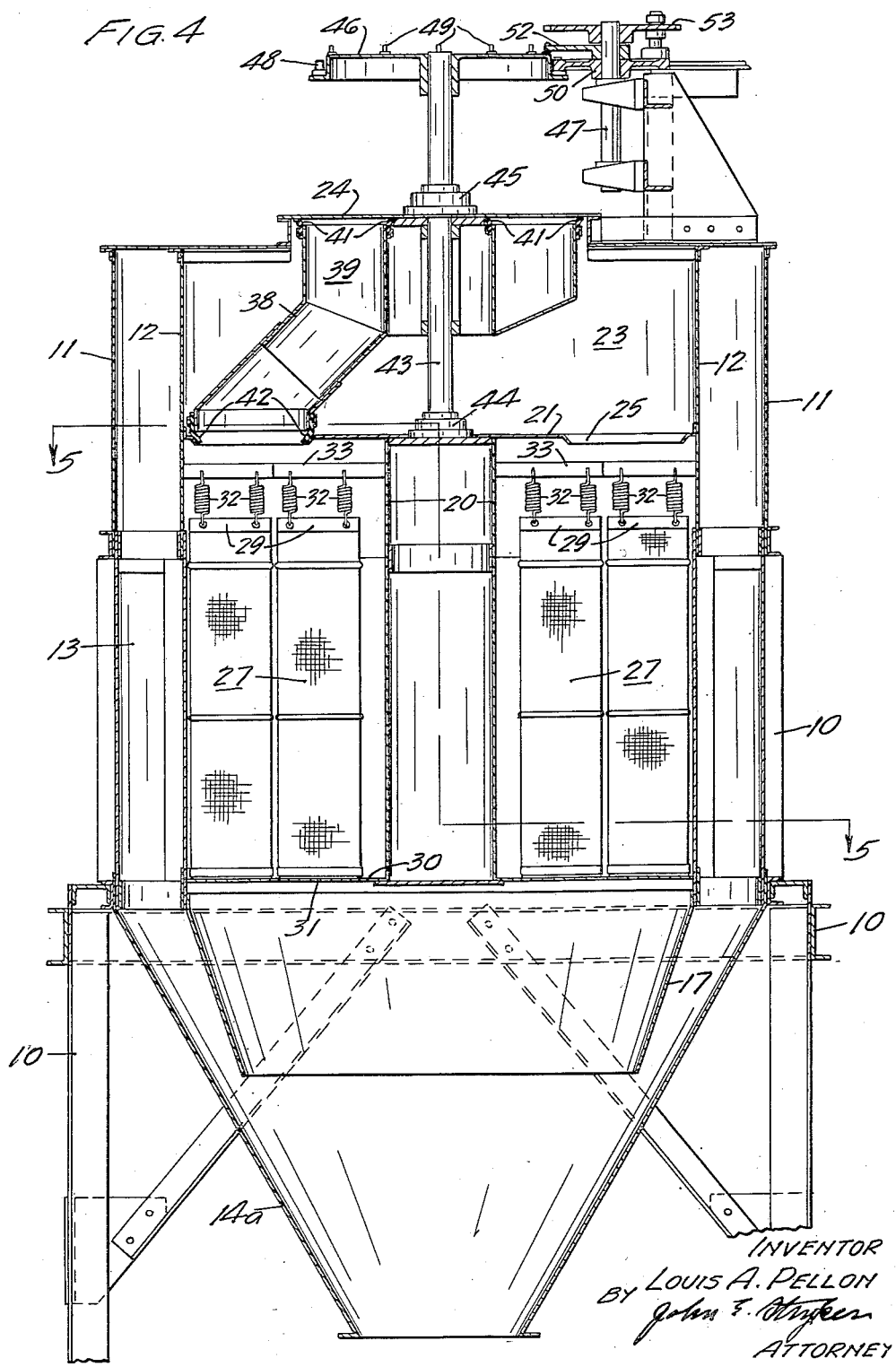

July 30, 1957

L. A. PELLON 2,800,976

DUST COLLECTOR

Filed March 8, 1954

INVENTOR
LOUIS A. PELLON
BY
John F. Strayken
ATTORNEY

2,800,976

DUST COLLECTOR

Louis A. Pellon, Richfield, Minn.

Application March 8, 1954, Serial No. 414,611

3 Claims. (Cl. 183—34)

This invention relates to improvements in dust collectors for various industrial uses including the purifying of air or other gases or for recovering solids of value therefrom, or for both purifying air or gases and recovery of solids therefrom.

It is an object of my invention to provide a highly efficient and economical arrangement of filter units and means for cleaning them or groups of them, one at a time, continuously during the filtering operation.

Another object is to afford in a dust collector unusually large filter areas in a compact casing of substantially cylindrical form.

A further object is to provide in apparatus of the class described, a multiplicity of separate filter chambers each containing one or more filter units in combination with rotary cleaning apparatus whereby reverse current air may be forced through the several filter chambers in the opposite direction one at a time to discharge accumulations of dust therefrom.

A further and particular object is to improve the efficiency of a dust collector of the class described by providing a multiplicity of porous fabric tubular filter units which are open at their normally lower ends and arranged to receive dust laden air or other gas through such openings and to discharge the filtered air through a common annular chamber disposed above the filter units.

My invention also includes certain other novel features of construction which will be more fully pointed out in the following specification and claims.

Referring to the accompanying drawings which illustrate, by way of example and not for the purpose of limitation, a preferred embodiment of my invention:

Figure 1 is a side elevational view of the dust collector;

Fig. 2 is a top plan view of the same with a portion of the motor-driven mechanism broken away to show parts otherwise concealed;

Fig. 3 is a part side elevational view and part fragmentary sectional view showing one of the tubular filter units;

Fig. 4 is a typical vertical sectional view through the dust collector;

Figure 5:
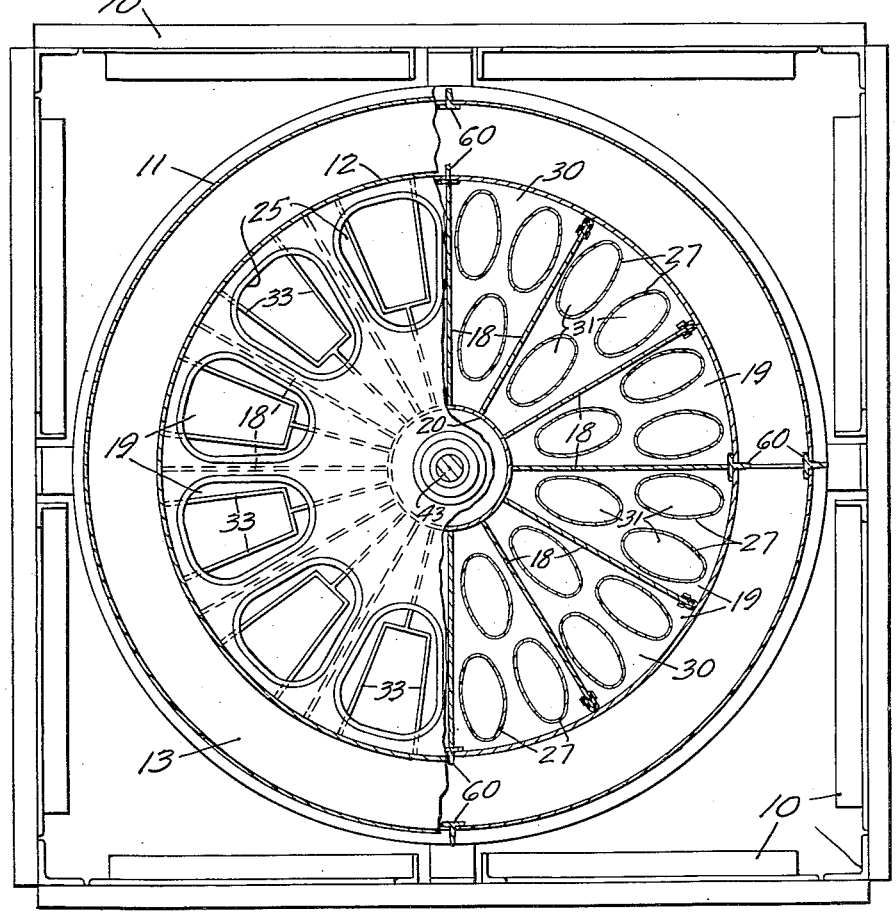
Fig. 5 is a horizontal sectional view taken approximately on the line 5—5 of Fig. 4.

As shown in the drawings, my improved dust collector is supported on a rigid frame indicated generally by the numeral 10 and has a substantially cylindrical outer casing 11 and an inner casing 12 spaced inward from the casing 11 to form an annular chamber 13 for dust laden air or other gas which is admitted to the upper portion of this chamber through a tangentially disposed inlet conduit 14. At its lower end the chamber 13 opens into the top of a conical hopper 14a which discharges dust into a bin 15 from which accumulations of solid particles may be removed by means of a cart 16.

An annular baffle 17 extends downward from the inner casing 12 within the hopper 14a and the annular space within the inner casing 12 above the baffle 17 is divided into a multiplicity of filter chambers by radially disposed, substantially vertical partitions 18. Filter chambers 19 are formed between these partitions which extend from a central well defined by a cylindrical wall 20, upward to a horizontal partition 21 and outward to the casing 12. Above the partition 21 is a large annular chamber 23 extending to a top wall 24 of the casing. Communicating with each of the chambers 19 is an opening 25 in the wall 21 through which the filtered gas or air passes into the chamber 23 and thence out through a main discharge conduit 26 (Figs. 1 and 2).

Figure 6:
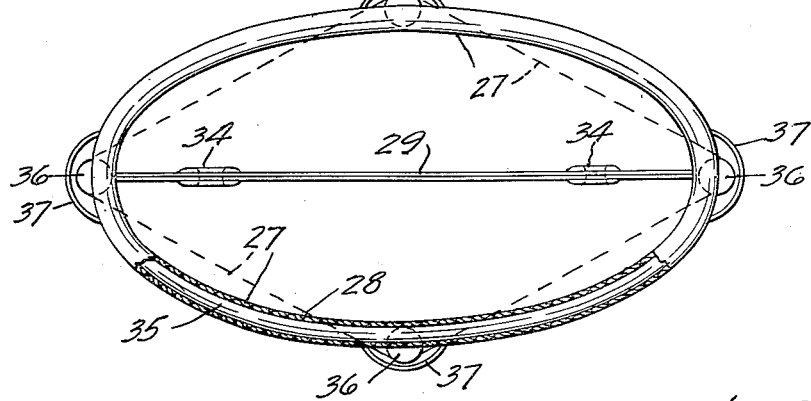
Fig. 6 is a part upper end view and part horizontal sectional view showing one of the filter units.

Mounted in each of the filter chambers 19 is a plurality of vertically elongated, tubular, porous fabric filter units indicated generally by the numeral 27. The walls of these units are preferably constructed from a durable textile fabric of the required porosity. As shown in detail in Figs. 3 and 6, each of these units preferably comprises a tubular, porous fabric wall 28 which is closed at its upper end by bringing the fabric together along a seam 29. The lower end of each unit is suitably fastened to a flange extending upward from a horizontal wall 30 forming the bottom of the filter chambers, openings 31 being formed in the wall 30 to communicate with the interior of the several filter units. Each unit is supported at its upper end and held under tension by a pair of coiled springs 32 depending from a horizontal supporting bar 33, the springs engaging grommets 34 extending through the seam 29. To retain each filter unit against collapse to retain the desired form, horizontally extending rods 35 of eliptical form are confined in annular pockets formed in the filter material and vertically extending rods 36 are confined in pockets 37 formed in the filter material. As shown in Fig. 6 one pair of diagonally opposite rods 36 are spaced further apart than the other pair in order to conform to the elliptic rod 35. In other words the rods 36 are spaced further with respect to one axis of the elliptic cross section of the filter units 27 than the axis transverse thereto. The several filter units are so shaped to permit a maximum number of units of convenient size to be contained in each of the filter compartments 19.

To supply reverse current air or other gas to the upper end portions of the several filter chambers, I provide a rotary conduit 38 (Fig. 4) adapted to be supplied with air or other gas under low pressure from an annular chamber 39 extending to the lower surface of the top wall 24. The air or other gas is admitted through a conduit 40 (Figs. 1 and 2) which communicates with the chamber 39 through an opening in the wall 24. Annular resilient sealing rings 41 are carried by the walls of the chamber 39 for sliding contact with the lower surface of the wall 24 and an annular sealing member 42 is provided for resilient contact with the wall 21 surrounding each of the openings 25.

As best shown in Fig. 4, a power-driven, vertical, centrally disposed shaft 43 is rigidly connected to the walls of the chamber 39 and is supported in bearings 44 and 45 mounted respectively on the walls 21 and 24. The upper end portion of the shaft 43 has fixed thereon a wheel 46 adapted to be turned intermittently through an angle corresponding to the angular spacing of the filter chambers 19. Driving mechanism for the wheel 46 may comprise a continuously driven shaft 47 and connections adapted to intermittently engage series of upwardly projecting pins 48 and 49 carried by the wheel 46. The operating mechanism may include a cam wheel 50 carried by the shaft 47 and formed with a peripheral notch 51 (Fig. 2) adapted to successively engage the pins 48 and a finger 52 carried by the shaft 47 and adapted to successively engage the pins 49. To continuously rotate the shaft 47, a sprocket wheel 53 is fixed on its upper end portion and operatively connected through suitable speed reducing mechanism to an electric motor 54. These connections may include speed reduction gearing connected to a vertical shaft 55, a sprocket 56 fixed on this shaft and a sprocket chain 57 trained on sprocket 56 and sprocket wheel 53.

To allow access to the filter chambers 19 and to facilitate the repair and replacement of the filter units 27, segments of the outer cylindrical wall 11 and inner cylindrical wall 12 are made removable and the several filter units are made removable from the individual filter chambers. Suitable fastening means for the wall segments are described in my co-pending application serial No. 374,027, filed August 13, 1953, upon which Patent Number 2,723,726 has issued for Dust Collector. Thus the fastening mechanism for the several segments may include pairs of clamp handles 58 which are pivotally connected at 59 to marginal portions of each of the wall segments. The cylindrical walls 11 and 12 are constructed from suitable sheet metal or other somewhat flexible material so that the segments of these walls may be bent sufficiently to permit their attachment to and detachment from the wall supporting frame members 60, best shown in Fig. 5.

The rate of flow of dust-laden air into the dust collector through the conduit 14 may be regulated by means of a damper 61 (Figs. 1 and 2) which is pivotally supported on a vertical shaft 62. An arm 63 is fixed on an end of the shaft 62 exteriorly of the conduit 14 and this arm may be secured in selected positions by suitable clamping means, including a bolt 64 adapted to engage a quadrant 65.

My improved dust collector is designed to afford, with simple modification, a fairly wide range of capacities as determined by the area of the porous fabric filter units. Thus by providing cylindrical walls 11 and 12 and partitions 18 of various lengths or vertical extent, the capacities of the several filter chambers may be adapted for conditions existing in various installations and the lengths of the filter units 27 may be varied accordingly.

In operation, filtered air or other gas is drawn from the outlet conduit 26 to the intake of an exhaust fan 26a of the required capacity in conventional or suitable manner, and air or other gas for filter cleaning purposes may be supplied to the conduit 40 from the main exhaust fan through a branch pipe carrying a portion of the fan discharge or the conduit 40 may be supplied from an auxiliary blower. Dust-laden air or gas enters the casing through the conduit 14 under control of the damper 61 and is drawn at a suitably high velocity in a spiral path downward through the chamber 13 and into the bin 15 and hopper 14a where a large percentage of the entrained dust is deposited by centrifugal or cyclone action. The air or other gas carrying the remaining dust fines is then drawn up through the baffle 17 and passes into the several tubular filter units through their bottom openings 31. The dust-laden air or other gas is thus distributed to the several filter units 27 and passes upward within these tubular members. Since the pressure in the filter chambers exteriorly of the porous fabric tubular members 27 is lower than that of the dust laden air entering these members, the air or other gas is drawn through the porous fabric material 28 and substantially all of the dust is deposited on the interior surfaces and in the pores of the several units, while filtered air is drawn out of the chambers 19 through the openings 25 in the wall 21 and thence through the outlet conduit 26.

During the filtering operation the motor 54, through its driving connections with the shaft 47, continuously rotates this shaft at a suitably low speed, e. g., approximately 2 to 4 R. P. M., and the cam wheel 50 and finger 52 carried by the shaft 47 are operative to turn the wheel 46 and vertical shaft 43 through angular increments corresponding to the angular spacing of the filter chambers 19, center to center, circumferentially of the casing. After each angular movement, the shaft 43 dwells in a stationary position wherein the rotary conduit 38 is in communication with one of the filter chambers through one of the openings 25 in the partition 21. Air or other gas under suitable pressure is thereby caused to pass from the conduit 40 through the chamber 39 and conduit 38 to the upper portion of a filter chamber 19 and then, as a reverse current, through the porous fabric sides of the filter units contained in the same chamber. This current dislodges accumulations of dust within the tubular filter units and causes the loosened solid particles to be discharged from the lower ends of these units into the conical hopper 14a and bin 15. The several groups of filter units are thus cleaned rapidly, one at a time, during the filtering operation.

During th normal filtering operation, the porous fabric tubular members 27 are expanded substantially to the elliptical form indicated in Fig. 5 by the increase in internal pressure. Since each of these filter units is held under longitudinal tension by the springs 32, the several wall portions between the rods 36 are biased toward the flat, straight wall positions indicated by broken lines in Fig. 6, to form a substantially diamond-shaped section when air is not being passed through the walls of the filter element. A third position of each tubular member is assumed when the reverse current air is applied through the conduit 38 to the several filter chambers successively, and the filter element assumes a configuration which is concave in section. During such times the several wall portions of the unit are drawn inward and assume concave shapes. Such inward and outward flexing of the filter walls occurs quickly and effectively dislodges accumulations of dust on the inner surfaces of the walls, such flexing, together with the reverse air flow through the pores of the fabric results in thorough cleaning of the filter units.

An unusually large area of porous fabric filter material and resulting large capacity is obtained by my arrangement of a plurality of individual filter units in each of a multiplicity of approximately radially disposed filter chambers. Due to the light dust load carried by each of the filter units in this arrangement, highly efficient operation is obtained. It will be evident that my improved dust collector combines the advantages of a cyclone type collector, whereby much of the dust is separated from the air or other gas before the latter reaches th filter units, and the advantages of filtering through a porous fabric medium divided into a highly efficient, economical and compact arrangement of separate units.

I claim:

1. Dust collection apparatus comprising a casing, a plurality of partition members within said casing, said partition members and said casing defining a plurality of filter chambers, first and second horizontal walls affixed to said casing and defining the vertical extent of said filter chambers, the first horizontal wall having a plurality of apertures therein in communication with each of said filter chambers, a plurality of tubular, flexible, elongated, yieldingly supported, porous fabric filter elements, disposed within said filter chambers and affixed to the first horizontal wall, one of said filter elements surroundingly communicating with each of said first horizontal wall apertures, said second wall defining a plurality of apertures, one of said second horizontal wall apertures being in communication with each of said filter chambers, a top wall affixed to said casing, said second wall, said casing, and said top wall being wall members defining an upper chamber, an outlet aperture in one of said wall members, means to cause dust-laden air or other gas to pass upwardly through said first horizontal wall apertures, said filter elements, and said second horizontal wall apertures and thence into said upper chamber and through said outlet aperture, a rotatable conduit disposed within said upper chamber, means to rotate said conduit and cause a passage defined by the conduit to register with the second horizontal wall apertures one at a time, means to cause a supply of low pressure air to pass downwardly through said conduit passage, said registered second horizontal wall aperture, said communicating filter chamber, and said filter elements located therein, whereby to cause said filter elements to flex and loosen dust particles clinging thereto, at least one support member mounted in each filter chamber, and a plurality of shape-retaining structures affixed to the first horizontal wall, one of said shape-retaining structures being affixed to the first horizontal wall about the perimeter of each of the apertures within said wall, each of said shape-retaining structures being disposed within a filter chamber, whereby to provide a construction in which each of the plurality of filter units is maintained in an expanded condition.

2. A dust collector comprising, outer and inner casings comprising substantially cylindrical outer and inner walls defining an annular cyclone chamber, a top wall affixed to the upper ends of the inner and outer walls, a duct tangentially attached to the outer wall at a point near the top wall, the duct defining a passage for air or other gas, the outer wall having an aperture therein to permit communication of the duct passage and the cyclone chamber, a first horizontal wall affixed to the lower end of the inner wall and having a plurality of apertures therein, a plurality of partition members within said inner wall, the partition members and the inner wall defining a plurality of filter chambers, each of such filter chambers being in communication with at least one of said first horizontal wall apertures, a second horizontal wall affixed to the inner casing intermediate the ends thereof and having a plurality of apertures therein, each of the filter chambers being in communication with one of such second horizontal wall apertures, the vertical extent of the filter chambers being defined by the first and second horizontal walls, a plurality of elongated, tubular, flexible, resiliently biased, porous fabric, filter elements disposed within each of such filter chambers, one of said filter elements being in surrounding communication at one end with each of said first horizontal wall apertures, said top wall, said second horizontal wall and said outer and inner walls being wall members defining an upper annular chamber, at least one of said wall members having an outlet aperture therein, means to drive dust-laden air or other gas through said duct into said cyclone chamber and thence downwardly over a spiral-like path to cause heavier dust particles to be separated from the gas, thence upwardly through said first horizontal wall apertures, through said filter elements and filter chambers, through said second horizontal wall apertures into said upper annular chamber, and thence outwardly through said outlet aperture, an air or other gas conduit disposed within said upper annular chamber, means to rotate said conduit at uniformly spaced time intervals and cause a passage defined by the conduit to communicate with said second horizontal wall apertures one at a time, and means to cause air or other gas under low pressure to pass through said conduit, through the second horizontal wall aperture in communication therewith, and thence through said filter elements, whereby to cause said filter elements to flex and separate encrusted dust from said filter elements, and a dust bin disposed beneath said chambers and said casings to catch said dust and direct it to a collection container.

3. Dust collection apparatus comprising a casing, a plurality of partition members within said casing, said partition members and said casing defining a plurality of filter chambers, first and second horizontal walls affixed to said casing and defining the vertical extent of said filter chambers, the first horizontal wall having a plurality of apertures therein in communication with each of said filter chambers, a plurality of tubular, flexible, elongated, yieldingly supported, porous fabric filter elements, disposed within said filter chambers and affixed to the first horizontal wall, one of said filter elements surroundingly communicating with each of said first horizontal wall apertures, said second wall defining a plurality of apertures, one of said second horizontal wall apertures being in communication with each of said filter chambers, a top wall affixed to said casing, said second wall, said casing, and said top wall being wall members defining an upper chamber, an outlet aperture in one of said wall members, means to cause dust-laden air or other gas to pass upwardly through said first horizontal wall apertures, said filter elements, and said second horizontal wall apertures and thence into said upper chamber and through said outlet aperture, a rotatable conduit disposed within said upper chamber, means to rotate said conduit and cause a passage defined by the conduit to register with the second horizontal wall apertures one at a time, a resilient gasket affixed to said conduit and adapted to engage said second horizontal wall about the perimeter of one of said second horizontal wall apertures when said conduit passage and said one second horizontal wall aperture are in registration, means to cause a supply of low pressure air to pass downwardly through said conduit passage, said registered second horizontal wall aperture, said communicating filter chamber, and said filter elements located therein, whereby to cause said filter elements to flex and loosen dust particles clinging thereto, at least one support member mounted in each filter chamber, at least one spring affixed to and biased between each filter element and one of the support members to supportably maintain said filter element under longitudinal tension, and a plurality of shape-retaining structures affixed to the first horizontal wall, one of said shape-retaining structures being affixed to the first horizontal wall about the perimeter of each of the apertures within said wall, each of said shape-retaining structures being disposed within a filter chamber, each of said filter elements being attached to one of said shape-retaining structures whereby to provide a construction in which each of the plurality of filter units is maintained in an expanded condition by the cooperation of the springs and the support structure attached to each of said filter units.

References Cited in the file of this patent

UNITED STATES PATENTS

| 1,743,934 | Ruemlin | Jan. 14, 1930 |
| 1,764,861 | Van Gelder | June 17, 1930 |
| 2,079,315 | Dickerson | May 4, 1937 |
| 2,369,649 | Abrams | Feb. 20, 1945 |
| 2,391,534 | Yerrick et al | Dec. 25, 1945 |

FOREIGN PATENTS

| 145,514 | Germany | Nov. 3, 1903 |
| 441,252 | Germany | Mar. 2, 1927 |
| 614,016 | Germany | May 31, 1935 |
| 781,022 | France | Feb. 18, 1935 |
| 834,636 | Germany | Mar. 20, 1952 |
| 895,816 | France | Apr. 11, 1944 |
| 1,058,555 | France | Nov. 4, 1953 |